(12) United States Patent
McElhinney

(10) Patent No.: US 8,570,834 B2
(45) Date of Patent: Oct. 29, 2013

(54) METHOD OF ACOUSTIC RANGING

(75) Inventor: Graham A. McElhinney, Aberdeenshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 556 days.

(21) Appl. No.: 12/869,401

(22) Filed: Aug. 26, 2010

(65) Prior Publication Data

US 2012/0051184 A1 Mar. 1, 2012

(51) Int. Cl.
*G01S 5/22* (2006.01)

(52) U.S. Cl.
USPC .......................................... 367/127

(58) Field of Classification Search
USPC ............................ 367/127, 57, 35
See application file for complete search history.

(56) References Cited

U.S. PATENT DOCUMENTS

| 4,003,017 | A | * | 1/1977 | Bailey ........................... 367/127 |
| 4,711,303 | A | | 12/1987 | Koeling et al. |
| 6,026,913 | A | | 2/2000 | Mandal et al. |
| 6,985,814 | B2 | | 1/2006 | McElhinney |
| 6,988,566 | B2 | | 1/2006 | Lockerd, Sr. et al. |
| 7,656,161 | B2 | | 2/2010 | McElhinney |
| 7,878,270 | B2 | * | 2/2011 | Lee et al. .................... 175/61 |
| 2004/0172197 | A1 | * | 9/2004 | Fehmers et al. ................ 702/6 |
| 2010/0224415 | A1 | * | 9/2010 | Lee et al. .................... 175/61 |
| 2012/0051184 | A1 | * | 3/2012 | McElhinney ................. 367/99 |

FOREIGN PATENT DOCUMENTS

| CA | 2746078 A1 | 12/2009 |
| EP | 0638823 A2 | 2/1995 |
| EP | 1666698 A1 | 6/2006 |
| WO | WO 2012027105 A1 * | 3/2012 |

OTHER PUBLICATIONS

International Search Report and Written Opinion for International Application No. PCT/US2011/047207 dated Jan. 9, 2012.

* cited by examiner

*Primary Examiner* — Daniel Pihulic
(74) *Attorney, Agent, or Firm* — Kimberly Ballew

(57) ABSTRACT

An acoustic surveying method includes computing at least one of a distance and direction between first and second subterranean boreholes. An acoustic pulsed is transmitted into a subterranean formation from the first borehole and received at three or more spaced receivers deployed in the second borehole. A distance between the two boreholes may be determined using longitudinally spaced receivers while a toolface to target direction (angle) may be determined using circumferentially spaced receivers.

19 Claims, 5 Drawing Sheets

METHOD OF ACOUSTIC RANGING

RELATED APPLICATIONS

None.

FIELD OF THE INVENTION

The present invention relates generally to drilling and surveying subterranean boreholes such as for use in oil and natural gas exploration. In particular, this invention relates to a method of acoustic ranging to determine bearing and/or range to such an acoustic target, for example, during drilling of a twin well.

BACKGROUND OF THE INVENTION

Both passive and active magnetic ranging techniques are well known in the oil field services industry and are commonly used for determining a distance and a direction to a magnetic target. Such magnetic ranging techniques have been successfully utilized in various commercial well twinning, well intercept, and well avoidance applications. For example, commonly invented and commonly assigned U.S. Pat. Nos. 6,985,814 and 7,656,161, disclose passive ranging methodologies suitable for use in well twinning applications. The '814 patent makes use of remanent magnetization in a target well casing string while the '161 patent teaches a method for magnetizing the target well casing string prior to deployment in the target well. While the above described passive ranging techniques have been successfully utilized in commercial well twinning applications, there is room for further improvement. For example, magnetic ranging can be susceptible to magnetic interference in certain applications. Moreover, magnetic ranging techniques are typically limited to relatively small separation distances between the twin and target wells (e.g., less than about 10 meters) unless very strong fields are utilized.

Therefore there exists a need for improved ranging techniques suitable for use, for example, in well twinning and well intercept applications.

SUMMARY OF THE INVENTION

Exemplary aspects of the present invention are intended to address the above described drawbacks of prior art ranging and twin well drilling methods. One aspect of this invention includes a method for acoustic surveying. An acoustic pulse is transmitted into a subterranean formation from a borehole (e.g., from a transmitter deployed in the lower BHA of a drill string in a drilling well). The pulse is received at first, second, and third acoustic receivers deployed in a second borehole (e.g., in a wireline tool deployed in a target well). In one exemplary embodiment, the receivers are longitudinally spaced apart from one another and at least one distance between the two wells is derived from the received pulses. In another exemplary embodiment the receivers are circumferentially spaced apart and a toolface to target angle between the two wells is derived from the received pulses.

Exemplary embodiments of the present invention provide several potential advantages. For example, embodiments of the invention enable accurate determination of the distance and direction between first and second subterranean boreholes. In preferred embodiments of the invention, the distance and direction can be determined with a single acoustic pulse. The use of a single acoustic pulse advantageously reduces noise and therefore improves ranging accuracy. Aspects of the invention further enable near bit (or even at bit) via deployment of an acoustic transmitter in the lower BHA of a drill string.

Exemplary embodiments of the present invention may be further advantageously utilized, for example, in various tunneling applications. The acoustic source may be deployed on a conventional tunneling machine, while the acoustic receivers may be deployed in and around a vertical shaft. Such an arrangement may advantageously aid horizontal to vertical tunneling intersections.

In one aspect the present invention includes a method for surveying a subterranean borehole. The method includes deploying an acoustic transmitter in a first borehole and deploying first, second, and third longitudinally spaced acoustic receivers in a second borehole. The acoustic transmitter is fired to launch an acoustic pulse. Corresponding acoustic waveforms are received at each of the first, second, and third acoustic receivers. The received acoustic waveforms are then processed in combination with a longitudinal spacing between the first, second, and third acoustic receivers to compute a distance between the first borehole and the second borehole.

In another aspect, this invention includes a method for surveying a subterranean borehole. The method includes deploying an acoustic transmitter in a first borehole and deploying first, second, and third circumferentially spaced acoustic receivers in a second borehole. The acoustic transmitter is fired to launch an acoustic pulse. Corresponding acoustic waveforms are received at each of the first, second, and third acoustic receivers. The received acoustic waveforms are then processed to determine a toolface to target angle between the first and second boreholes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realize by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
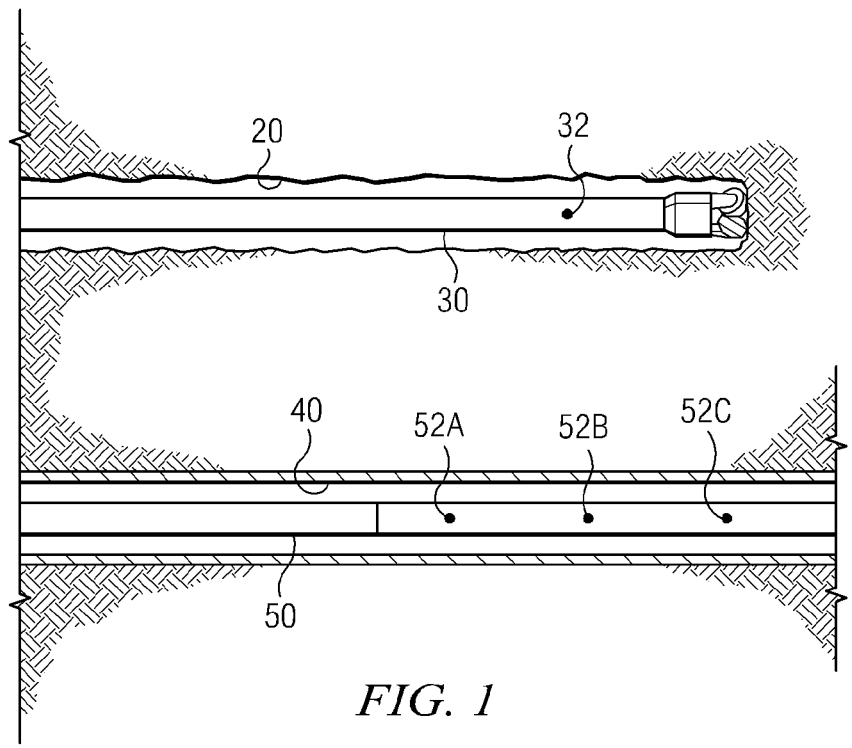
FIG. 1 depicts one example of a well twinning operation in which exemplary embodiment of the present invention may be utilized.

Referring now to FIGS. 1 through 8, exemplary embodiments of the present invention are depicted. With respect to FIGS. 1 through 8, it will be understood that features or aspects of the embodiments illustrated may be shown from various views. Where such features or aspects are common to particular views, they are labeled using the same reference numeral. Thus, a feature or aspect labeled with a particular reference numeral on one view in FIGS. 1 through 8 may be described herein with respect to that reference numeral shown on other views.

FIG. 1 depicts an exemplary well twinning operation in which a twin well 20 is being drilled approximately parallel to a target well 40. The tool configuration depicted is suitable for making acoustic ranging measurements in accordance with the present invention. In the exemplary embodiment depicted, an acoustic transmitter 32 is deployed in a bottom hole assembly (BHA) 30 which is in turn deployed in the twin well 20. The acoustic transmitter 22 is preferably, although not necessarily, deployed as low in the BHA as is practical so as to advantageously provide for near-bit or even at-bit acoustic ranging measurements. The BHA 30 includes a drill bit and may further include other downhole tools and sensors suitable for use in various drilling operations. The invention is not limited to such other tooling and sensors.

FIG. 1 further depicts an acoustic receiving tool 50 deployed in the twin well 40. In the exemplary embodiment depicted, receiving tool 50 includes three or more longitudinally spaced acoustic receivers 52A, 52B, and 52C deployed in a tool body. Receiving tool 50 may include, for example, a conventional wireline acoustic tool including the aforementioned longitudinally spaced acoustic receivers. The tool 50 may be deployed, for example, on a coiled tubing string or on a conventional wireline assembly and is preferably in electronic communication with the surface, e.g., via a conventional data-link. While the acoustic receivers 52A, 52B, are 52C are depicted as being deployed in a tool body, they may also be deployed, for example, on corresponding extendable pads so as to contact the borehole wall. The invention is not limited in these regards.

It will be understood by those of ordinary skill in the art that the deployment depicted on FIG. 1 is merely exemplary for purposes of describing the invention set forth herein. It will be further understood that methods in accordance with the present invention are not limited to use in well twinning operations (as depicted). The inventive methods are equally well suited for use with substantially any other subterranean drilling operation in which ranging measurements are made between first and second wells.

While the invention is not limited in this regard, deployment of the acoustic transmitter in the drilling well and the acoustic receivers in the target well tends to be advantageous. For example, deployment of the receivers in the target well essentially eliminates drilling noise from the received waveforms (and therefore tends to significantly increase the signal to noise ratio). Deployment of the receivers in the target well also promotes rapid communication with the surface, for example, via a conventional wireline data-link.

Figure 2:
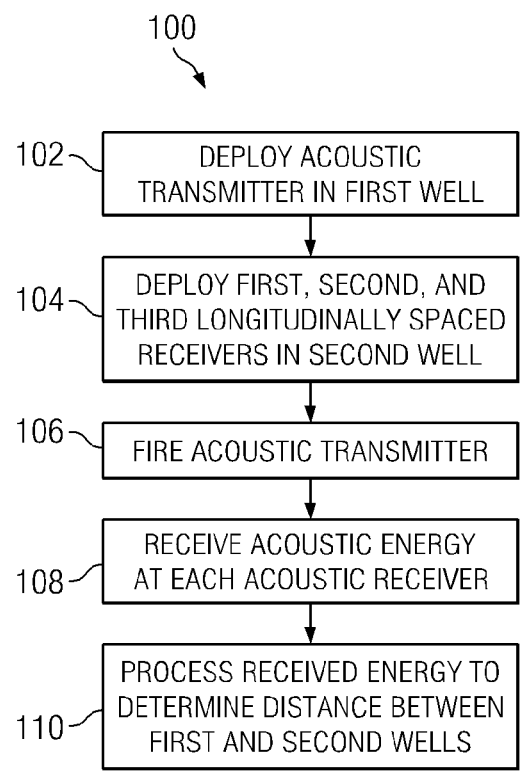
FIG. 2 depicts a flow chart of one exemplary method embodiment in accordance with the present invention.

FIG. 2 depicts a flow chart of one exemplary embodiment of an acoustic ranging method 100 in accordance with the present invention. An acoustic transmitter is deployed in a first well at 102 (preferably the drilling well). At least first, second, and third longitudinally spaced acoustic receivers are deployed in a second well at 104 (preferably the target well). The acoustic transmitter is fired at 106 to propagate acoustic energy into the surrounding subterranean formation. The acoustic energy is then received at 108 at each of the acoustic receivers in the second well. The received energy is then processed at 110 to determine at least one distance between the first and second wells. For example, the received energy may be processed to acquire at least first and second pole angles which may be in turn further processed to obtain a distance between the acoustic transmitter and one of the acoustic receivers.

Figure 3:
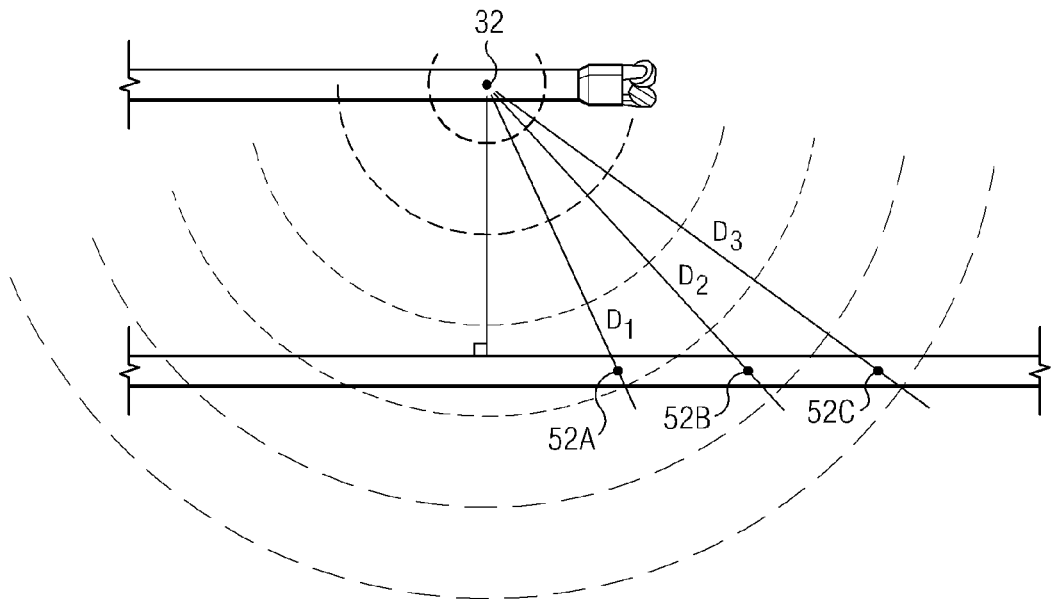
FIG. 3 depicts one exemplary arrangement for making acoustic ranging measurements in accordance with the present invention.

FIG. 3 depicts an exemplary firing of transmitter 32 at step 106. Those of ordinary skill in the art will readily appreciate that the transmitted acoustic energy enters the formation and typically induces compressional and/or shear waves therein. These acoustic waves propagate radially outward from the transmitter 32 (e.g., in substantially spherical waves). Due to the spacing between the acoustic receivers 52A, 52B, and 52C, the acoustic energy (e.g., the compressional and/or shear waves) arrives first at receiver 52A, followed by receiver 52B, and finally at receiver 52C. As further depicted on FIG. 4, pole angles may be determined from the differences in arrival times of the acoustic energy at the acoustic receivers (i.e., the time delay between the arrival at a first receiver and the arrival at a second receiver). These pole angles may be determined, for example, from the time delays between various longitudinally spaced receivers and the longitudinal distances between the receivers. The pole angles may be represented mathematically, for example, as follows:

$$\theta_1 = \arcsin\left(\frac{v\Delta t_1}{d}\right);$$
$$\theta_2 = \arcsin\left(\frac{v\Delta t_2}{d}\right)$$

Figure 4:
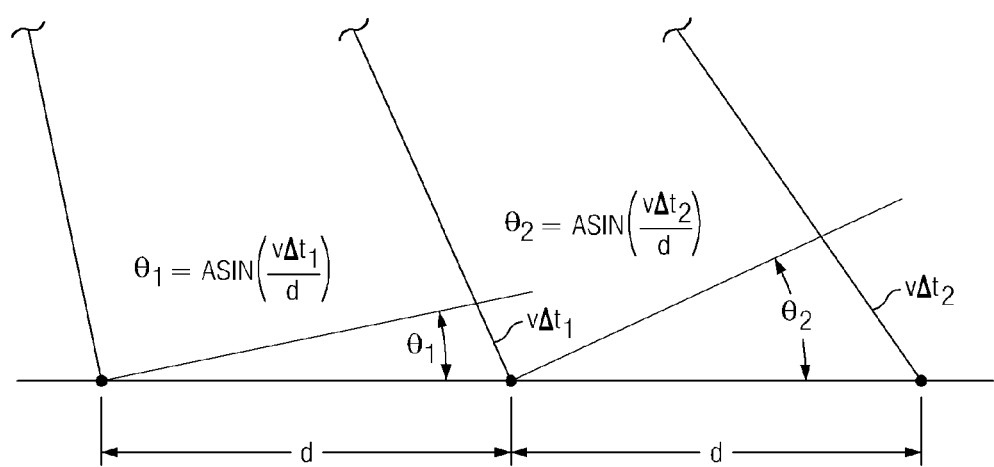
FIGS. 4 and 5 depict schematics of exemplary triangulation calculations in accordance with the present invention.
Figure 5:
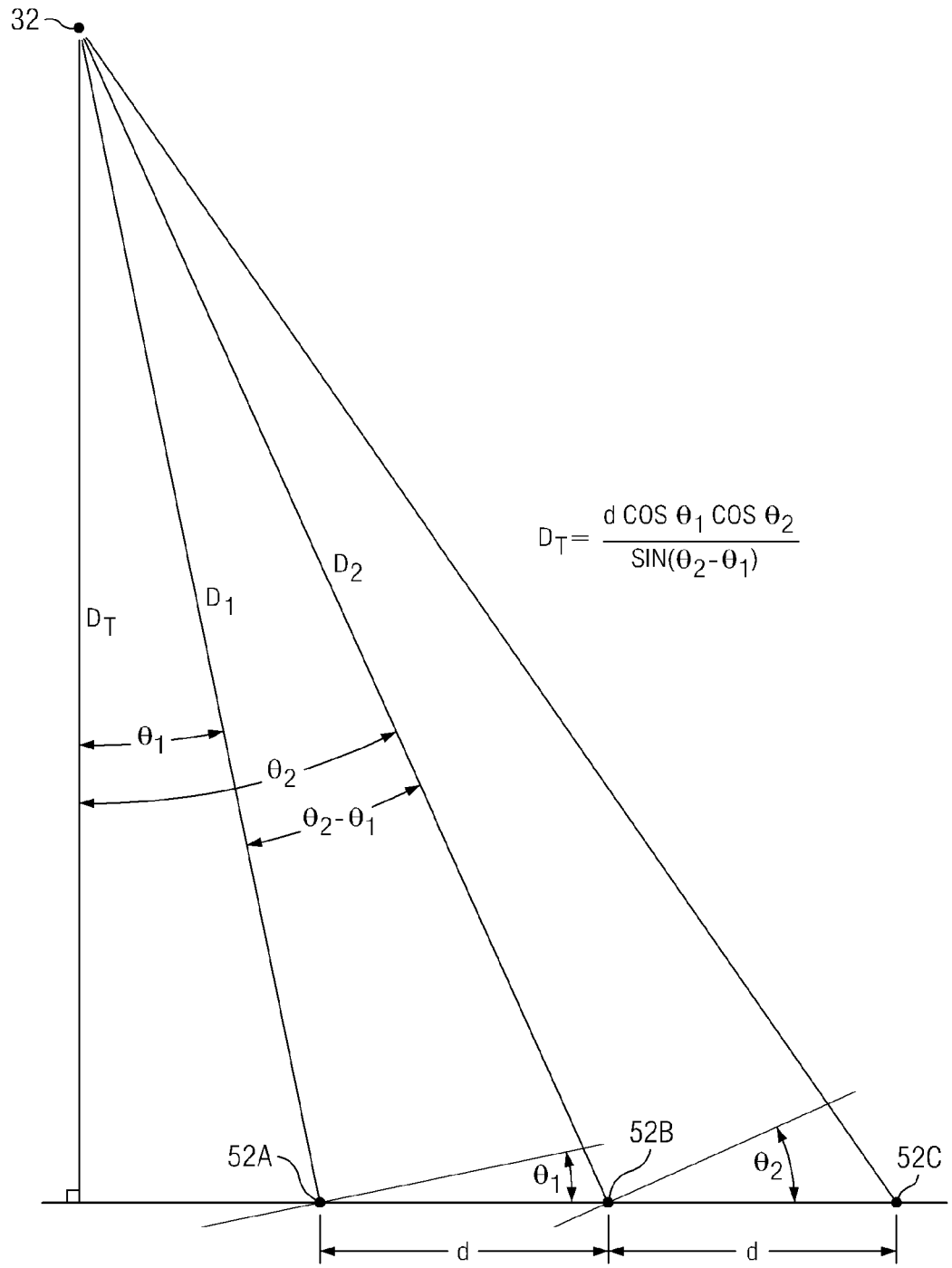

Equation 1 where $\theta_1$ and $\theta_2$ represent the computed pole angles (e.g., as depicted on FIG. 4), v represents the velocity of sound in the formation, d represents the longitudinal separation distance between the acoustic receivers, and $\Delta t_1$ and $\Delta t_2$ represent the time delays between the first and second and second and third receivers (i.e., between receivers 52A and 52B and between receivers 52B and 52C as depicted on FIG. 4). It will be understood that the speed of sound in the formation may be determined via any known means (e.g., via measurement or calculation). It will also be understood that the acoustic receivers are not necessarily equally spaced as depicted on FIGS. 3 and 4.

Received acoustic waveforms commonly include at least one compressional wave followed by at least one shear wave (although the invention is not limited in this regard). The time delays $\Delta t_1$ and $\Delta t_2$ may be determined from the arrival times of any component (or components) of the received waveforms. For example, in one exemplary embodiment, the time delays may be determined from the arrival times of a compressional wave. Pole angles may then be computed using the velocity of the compressional wave. In another exemplary embodiment, the time delays may be determined from the arrival times of a shear wave. Pole angles may then be computed using the velocity of the shear wave. In certain embodiments it may be advantageous to compute pole angles using both compressional and shear wave arrivals. Substantially any suitable waveform processing techniques (e.g., including semblance algorithms) may be utilized to determine the arrival times of the various waveform components. The invention is not limited in these regards.

The aforementioned pole angles may be further processed (e.g. via triangulation calculations) to obtain one or more distances between the first and second wells. For example, distances between the acoustic transmitter 32 and the first and second receivers 52A and 52B may be represented mathematically as follows:

$$D_1 = \frac{d\cos\theta_1}{\sin(\theta_2 - \theta_1)};$$ Equation 2

$$D_2 = \frac{d\cos\theta_2}{\sin(\theta_2 - \theta_1)}$$

where $D_1$ and $D_2$ represent the distances between the acoustic transmitter and the first and second receivers 52A and 52B, and $\theta_1$, $\theta_2$, and d are as defined above. A transverse distance $D_T$ between the acoustic transmitter 32 and the second well 40 may also be determined (see FIG. 5). The transverse distance is measured along a direction orthogonal (transverse) to the second well and may be thought of as being the shortest distance between the transmitter and the second well. The transverse distance $D_T$ may be represented mathematically, for example, as follows:

$$D_T = \frac{d\cos\theta_1\cos\theta_2}{\sin(\theta_2 - \theta_1)}$$ Equation 3 where $\theta_1$, $\theta_2$, and d are as defined above.

Figure 6:
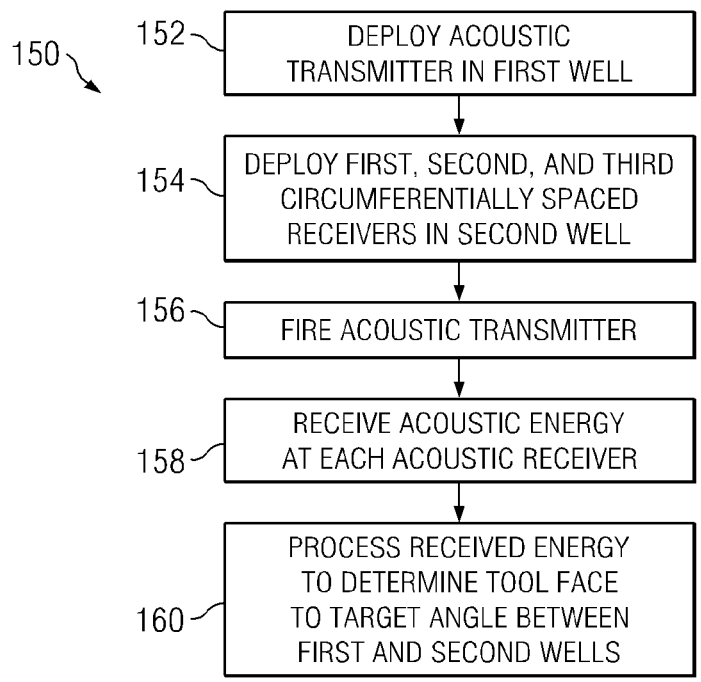
FIG. 6 depicts a flow chart of another exemplary embodiment in accordance with the present invention.

FIG. 6 depicts a flow chart of another exemplary acoustic ranging method embodiment 150 in accordance with the present invention. An acoustic transmitter is deployed in a first well at 152. At least first, second and third circumferentially spaced acoustic receivers are deployed in a second well at 154. The acoustic transmitter is fired at 156 to propagate acoustic energy into the surrounding subterranean formation. The acoustic energy is then received at 158 at each of the circumferentially spaced receivers in the second well. The arrival times of the received acoustic energy may then be processed at 160 to determine a tool face to target angle (TFT) between the first and second wells.

Figure 7:
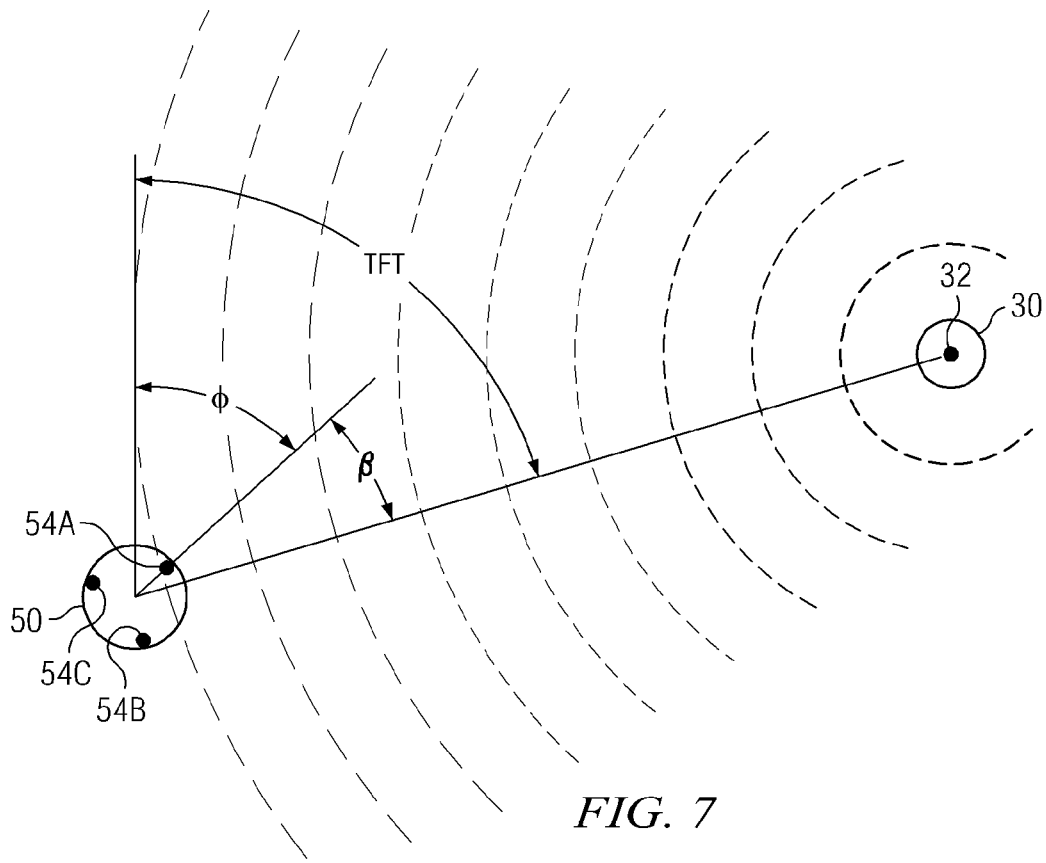
FIG. 7 depicts another exemplary arrangement for making acoustic ranging measurements in accordance with the present invention.
Figure 8:
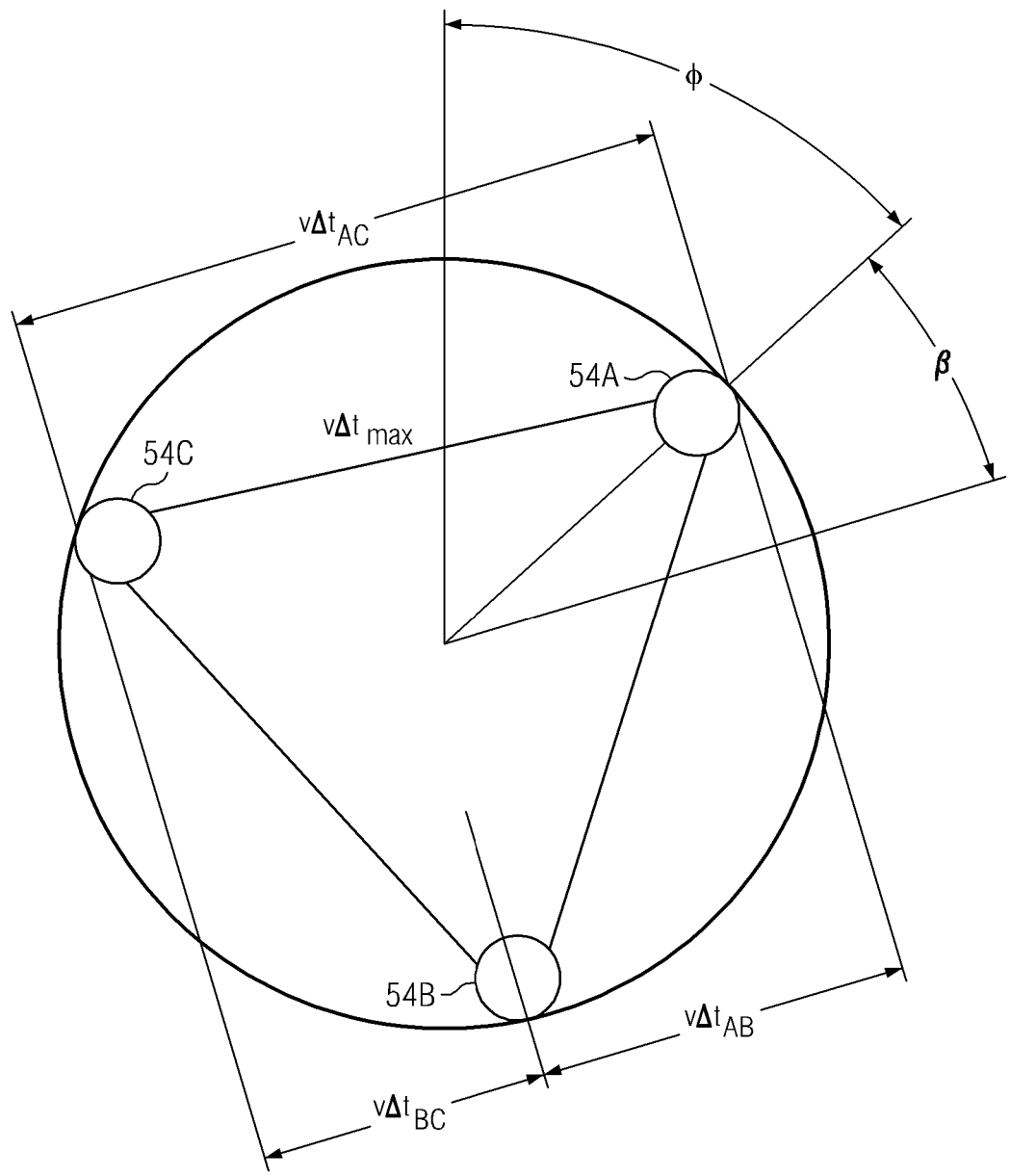
FIG. 8 depicts a schematic of another exemplary triangulation calculation in accordance with the present invention.

FIG. 7 depicts a circular cross-section looking down the target well 40. In many ranging applications (e.g., SAGD applications), the twin and target wells 20 and 40 are intended to be substantially parallel. In such applications, the view of FIG. 7 is also looking down the twin well 20. In this particular embodiment, the acoustic measuring tool 50 includes at least three circumferentially spaced, co-planar acoustic receivers 54A, 54B, and 54C. The TFT may be determined from the arrival times of the acoustic energy at each of the receivers 54A, 54B, and 54C. In this particular embodiment the TFT defines a direction from the target well to the transmitter in the plane of the circumferentially spaced receivers. The TFT may be referenced, for example, relative to the receiver that first receives the acoustic energy (e.g., receiver 54A in FIG. 7) or with respect to a reference direction such as magnetic north or high side. TFT may be represented mathematically, for example, as follows:

$$TFT = \beta + \phi = \arcsin\left(\frac{\Delta t_{AC} - \Delta t_{AB}}{\Delta t_{MAX}}\right) + \phi$$ Equation 4 where TFT represents the tool face to target angle, $\beta$ represents the angular separation between the acoustic transmitter and receiver 54A (i.e., the TFT referenced with respect to receiver 54A), $\phi$ represents an angular separation between receiver 54A and a reference direction (e.g., high side as depicted), $\Delta t_{AB}$ represents the time delay between reception of the acoustic wave at receiver 54A and receiver 54B, $\Delta t_{AC}$ represents the time delay between reception of the acoustic wave at receiver 54A and receiver 54C, and $\Delta t_{MAX}$ is a tool constant that represents the maximum time delay between any two receivers (A, B, or C). $\Delta t_{MAX}$ may be determined, for example, by dividing the speed of sound in the formation by the known distance between the receivers (e.g., the distance between receivers 54A and 54B—the length of one of the sides of equilateral triangle ABC). $\Delta t_{MAX}$ may also be determined empirically by rotating the sensors in the target well. In this empirical determination of $\Delta t_{MAX}$, the TFT may advantageously be determined independent of any knowledge regarding the velocity of sound in the formation.

With continued reference to FIG. 7 and Equation 3 (and further reference to FIG. 8), it will be understood that $\Delta t_{AC} - \Delta t_{AB} = \Delta t_{BC}$, where $\Delta t_{BC}$, represents the time delay between reception of the acoustic wave at receiver 54B and receiver 54C. It will also be understood that the angular separation $\phi$ may be referenced with respect to substantially any suitable reference direction, for example, including magnetic north and the high side of the target well. Those of ordinary skill in the art will readily appreciate that the angular separation $\phi$ may be determined, for example, via measurements of Earth's magnetic field and/or gravitation field. Referencing the TFT with respect to a standard reference direction (such as high side) advantageously enables a simple reversal of the TFT so as to enable the direction of the target well to be determined from the measuring well.

A distance between the wells (e.g., between the transmitter and the receivers) may also be determined by making multiple TFT angle measurements and triangulating. This may be accomplished, for example, by equipping the acoustic measurement tool 50 with multiple (e.g., first and second) longitudinally spaced sets of circumferentially spaced acoustic receivers. The TFT angles measured at each of the receiver sets may then be utilized to determine a unique triangle in three-dimensional space. The distance between the well may then be determined by applying trigonometric techniques to the measured TFT angles and the known axial distance between the receiver sets, for example, using techniques similar to those disclosed in commonly invented and commonly assigned U.S. Pat. No. 6,985,814.

Acoustic ranging methods in accordance with the present invention may be advantageously utilized in various well twinning and well intercept applications (e.g., such as steam assisted gravity drainage well twinning applications and coal bed methane horizontal to vertical intercepts). In such applications, at least one of the distance and direction between the acoustic transmitter and receivers may be utilized to guide subsequent drilling of the drilling well (i.e., to determine a subsequent direction of drilling). For example, during a well twinning operation it may be desirable to maintain the distance and the direction between the transmitter and receivers at predetermined constant values (or within predetermined ranges). Deviation from these values (or ranges) typically requires a change in drilling direction.

In the exemplary embodiments described above (e.g., with respect to Equations 1-4) the transmitted acoustic wave has been assumed to be planar (i.e., as a spherical wave having an infinite radius of curvature). It will be understood to those of ordinary skill in the art that the acoustic wave may also be modeled as a spherical wave having a finite radius of curvature, for example, equal to a distance determined in a previous measurement. The invention is not limited in these regards. Those of ordinary skill in the art will further appreciate that modeling the acoustic wave as a spherical wave may provide improved accuracy when the separation distance is small (e.g., less than about 10 m).

While deployment of the acoustic transmitter in the measuring well (e.g., in the lower BHA) tends to accrue certain advantages, it will be understood that the invention is not limited in this regard. The acoustic transmitter may also be deployed in the target well (e.g., in a wireline tool) and the acoustic receivers may be deployed in the measuring well (e.g., in the drill string).

Although not shown in FIGS. 1 and 2, it will be appreciated that the BHA 30 and the acoustic receiving tool 50 typically include electronic controllers. The controller in the BHA 30 typically includes, for example, conventional electrical drive voltage electronics (e.g., a high voltage power supply) configured to cause the transmitter to transmits one or more pulses of acoustic energy. The controller in the receiving tool 50 typically includes receiving electronics, such as a variable gain amplifier for amplifying the return signal. The receiving electronics may also include various filters (e.g., pass band filters), rectifiers, multiplexers, and other circuit components for processing the return signal. The controller in the receiving tool 50 may further include electronics configured to digitize the received waveforms. The digitized waveforms may then be transmitted to the surface (e.g., via a wireline data-link).

Suitable controllers typically further include digital programmable processors such as a microprocessor or a microcontroller and processor-readable or computer-readable programming code embodying logic, including instructions for controlling the function of the tool. Substantially any suitable digital processor (or processors) may be utilized, for example, including an ADSP-2191M microprocessor, available from Analog Devices, Inc. A suitable controller may also optionally include other controllable components, such as other sensors, data storage devices, power supplies, timers, and the like. The controller may also optionally be disposed to communicate with the surface.

It will be understood that various aspects and features of the present invention may be embodied as logic that may be represented as instructions processed by, for example, a computer, a microprocessor, hardware, firmware, programmable circuitry, or any other processing device well known in the art. Similarly the logic may be embodied on software suitable to be executed by a processor, as is also well known in the art. The invention is not limited in this regard. The software, firmware, and/or processing device may be included, for example, on a surface computer. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

I claim:

1. A method for surveying a subterranean borehole, the method comprising:
   (a) deploying an acoustic transmitter in a first borehole;
   (b) deploying first, second, and third longitudinally spaced acoustic receivers in a second borehole;
   (c) firing the acoustic transmitter to launch an acoustic pulse;
   (d) receiving corresponding acoustic waveforms at each of the first, second, and third acoustic receivers; and
   (e) processing the acoustic waveforms received in (d) in combination with at least one longitudinal spacing between the first, second, and third acoustic receivers to compute first and second pole angles; and
   (f) processing the first and second pole angles computed in (e) to further compute a distance between the first borehole and the second borehole.

2. The method of claim 1, wherein:
   the acoustic transmitter is located on a bottom hole assembly of a drill string deployed in the first borehole; and
   the first, second, and third acoustic receivers are located on a wireline acoustic receiving tool deployed in the second borehole.

3. The method of claim 1, wherein (e) further comprises:
   (i) processing the acoustic waveforms received in (d) to determine a first time delay between acoustic arrivals at the first receiver and the second receiver and a second time delay between acoustic arrivals at the second receiver and the third receiver; and
   (ii) processing the first time delay and the second time delay to compute the distance.

4. The method of claim 3, wherein the first and second time delays are determined with respect to at least one of a compressional wave and a shear wave.

5. The method of claim 1, wherein (e) further comprises:
   (i) processing the acoustic waveforms received in (d) to determine a first time delay between acoustic arrivals at the first receiver and the second receiver and a second time delay between acoustic arrivals at the second receiver and the third receiver; and
   (ii) processing the first time delay and the second time delay to compute the first and second pole angles.

6. The method of claim 5, wherein the first and second pole angles are computed in (ii) according to the equations:

$$\theta_1 = \arcsin\left(\frac{v\Delta t_1}{d}\right)$$

$$\theta_2 = \arcsin\left(\frac{v\Delta t_2}{d}\right)$$

wherein $\theta_1$ and $\theta_2$ represent the first and second poles angles, $\theta$ represents an acoustic velocity of a formation, d represents the longitudinal spacing between the first and second acoustic receivers and the second and third acoustic receivers, and $\Delta t_1$ and $\Delta t_2$ represent the first and second time delays.

7. The method of claim 5, wherein the distance is computed according to at least one of the following equations:

$$D_1 = \frac{d\cos\theta_1}{\sin(\theta_2 - \theta_1)}$$

$$D_2 = \frac{d\cos\theta_2}{\sin(\theta_2 - \theta_1)}$$

$$D_T = \frac{d\cos\theta_1\cos\theta_2}{\sin(\theta_2 - \theta_1)}$$

wherein $D_1$ represents a distance between the acoustic transmitter and the first acoustic receiver, $D_2$ represents a distance between the acoustic transmitter and the second acoustic receiver, $D_T$ represents a transverse distance between the acoustic transmitter and the second borehole, $\theta_1$ and $\theta_2$ represent the first and second poles angles, $v$ represents an acoustic velocity of a formation, and d represents the longitudinal spacing between the first and second acoustic receivers and the second and third acoustic receivers.

8. The method of claim 1, wherein the distance is a transverse distance between the acoustic transmitter and the second borehole.

9. A method for surveying a subterranean borehole, the method comprising:
   (a) deploying an acoustic transmitter in a first borehole;
   (b) deploying first, second, and third circumferentially spaced acoustic receivers in a second borehole;
   (c) firing the acoustic transmitter to launch an acoustic pulse;
   (d) receiving corresponding acoustic waveforms at each of the first, second, and third acoustic receivers; and
   (e) processing the acoustic waveforms received in (d) to determine a toolface to target angle between the first and second boreholes.

10. The method of claim 9, wherein:
   the acoustic transmitter is located on a bottom hole assembly of a drill string deployed in the first borehole; and
   the first, second, and third acoustic receivers are located on a wireline acoustic receiving tool deployed in the second borehole.

11. The method of claim 9, wherein (e) further comprises:
   (i) processing the acoustic waveforms received in (d) to determine a first time delay between acoustic arrivals at the first receiver and the second receiver and a second time delay between acoustic arrivals at the first receiver and the third receiver; and
   (ii) processing the first time delay and the second time delay to compute the toolface to target angle.

12. The method of claim 11, wherein the toolface to target angle is computed using the following equation:

$$TFT = \beta + \phi = \arcsin\left(\frac{\Delta t_1 - \Delta t_2}{\Delta t_{MAX}}\right) + \phi$$

where TFT represents the toolface to target angle with respect to a reference direction, $\beta$ represents the tool face to target angle with respect to the first acoustic receiver, $\phi$ represents an angular separation between the first acoustic receiver and a reference direction, $\Delta t_1$ and $\Delta t_2$ represent the first and second time delays, and $\Delta t_{MAX}$ represents a maximum time delay between any two of the first, second, and third acoustic receivers.

13. The method of claim 12, wherein $\Delta t_{MAX}$ is determined empirically.

14. The method of claim 12, wherein $\Delta t_{MAX}$ is computed based upon an acoustic velocity of a formation.

15. The method of claim 12, wherein the reference direction is a high side of the second borehole.

16. The method of claim 9, wherein (e) further comprises:
   (i) processing the acoustic waveforms received in (d) to determine a time delay between acoustic arrivals at the second receiver and the third receiver; and
   (ii) processing the time delay to compute the toolface to target angle.

17. A method for surveying a subterranean borehole, the method comprising:
   (a) deploying an acoustic transmitter in a first borehole;
   (b) deploying at least first and second sets of longitudinally spaced acoustic receivers in the second borehole, each of the first and second sets of acoustic receivers including corresponding first, second, and third circumferentially spaced acoustic receivers;
   (c) firing the acoustic transmitter to launch an acoustic pulse;
   (d) receiving corresponding acoustic waveforms at each of the first and second sets of acoustic receivers; and
   (e) processing the acoustic waveforms received in (d) to determine at least first and second toolface to target angles between the first and second boreholes.

18. The method of claim of claim 17, further comprising:
   (f) processing the first and second toolface to target angles obtained in (e) to determine at least one distance between the first and second boreholes.

19. The method of claim 17, wherein:
   the acoustic transmitter is located on a bottom hole assembly of a drill string deployed in the first borehole; and
   the first and second sets of acoustic receivers are located on a wireline acoustic receiving tool deployed in the second borehole.

* * * * *